Patented Oct. 11, 1932

1,881,861

UNITED STATES PATENT OFFICE

MARTIN MUELLER-CUNRADI, OF LUDWIGSHAFEN-ON-THE-RHINE, AND BERTHOLD OTTENS, OF NEUROESSEN, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF HIGHLY CONCENTRATED PARAFFIN WAX

No Drawing. Application filed July 19, 1929, Serial No. 379,566, and in Germany September 5, 1928.

This invention relates to improvements in the manufacture and production of highly concentrated paraffin wax.

We have found that a highly concentrated paraffin wax can be obtained from paraffin wax, which may still contain considerable quantities of oil in a very satisfactory manner by treating the crude paraffin wax with water to which a wetting agent, which term also comprises emulsifying agents has been added.

For example a crude paraffin wax which has been obtained by cooling mineral oil or tar oils, for example brown coal tar oil or destructive hydrogenation products of carbonaceous materials and filtration by suction can be treated while still on the filter with water to which a little soap has been added. Or the crude paraffin wax can be placed in a centrifuge, and if desired after separating a portion of the oil by centrifuging, can be washed, while centrifuging, with an aqueous solution of soap. Other devices which are suitable for this treatment may also be employed. Instead of an aqueous soap solution aqueous solutions of other wetting agents such as aromatic and in particular polynuclear sulphonic acids, and especially such as are alkylated in the nucleus, for example isobutylated naphthalene sulphonic acids, which may also be employed in the form of their salts, or potassium, sodium or ammonium soaps, or saponified oxidation products of paraffin wax or similar substances may be employed. The saponified oxidation products of paraffin wax are obtained by treatment of the oxidation products of solid paraffin hydrocarbons with a quantity of alkali metal hydroxide sufficient or less than sufficient for the saponification of the saponifiable constituents, if desired with the addition, before or after the saponification, of water-insoluble substances, in particular hydrocarbons or their derivatives which if desired may contain dissolved therein sulphur or other substances. The process according to the present invention may be carried out at low, ordinary or elevated temperatures for example between 0 and 50° centigrade. The treatment is often carried out with the paraffin wax in a solid state.

The following examples will further illustrate the nature of this invention, but the invention is not restricted to these examples.

Example 1

A crude paraffin wax, containing about 60 per cent of paraffin wax, obtained by cooling a destructive hydrogenation product of brown coal and filtration, is well washed with a 2 per cent solution of potassium soap while still on the filter. An approximately 95 per cent paraffin wax of a white colour is obtained.

Example 2

A paraffin wax containing about 65 per cent of paraffin wax, obtained by cooling gas oil and filtering by means of a revolving filter, is introduced into a centrifuge of a diameter of 1.2 metres and, after separating if desired a portion of the oil by centrifuging whereby with a speed for example of 700 revolutions per minute the paraffin wax content does not become more than 80 per cent, the said wax is washed with a 2 per cent solution of sodium isopropylnaphthalene sulphonate; a product having a paraffin wax content of 95 per cent or more is obtained. The paraffin wax is melted and is thus separated from the adherent aqueous fraction. The solution employed for washing may be employed again after separation of the oil.

What we claim is:

1. A process for the production of highly concentrated paraffin wax, which comprises acting on hard crude paraffin wax with water containing an aromatic sulphonic acid.

2. A process for the production of highly concentrated paraffin wax, which comprises acting on hard crude paraffin wax with water containing alkylated polynuclear aromatic sulphonic acid.

3. A process for the production of highly concentrated paraffin wax, which comprises passing through hard crude paraffin wax an aqueous solution of isopropylnaphthalene sulphonic acid in the form of its sodium salt.

4. A process for the production of highly concentrated paraffin wax, which comprises passing through hard crude paraffin wax an aqueous solution of isopropylnaphthalene sulphonic acid in the form of its sodium salt while centrifuging.

5. In the production of highly concentrated paraffin wax by washing hard crude paraffin wax with water containing a wetting agent selected from the class consisting of aromatic sulfonic acids and saponified oxidation products of paraffin wax, the step which comprises forcing water containing said wetting agent through the said wax while the wax is in a solid state.

6. A process for the production of highly concentrated paraffin wax which comprises acting on hard crude paraffin wax with water containing a wetting agent selected from the class consisting of aromatic sulfonic acids and saponified oxidation products of paraffin wax.

7. A process for the production of highly concentrated paraffin wax which comprises acting on hard crude paraffin wax with water containing a saponified oxidation product of paraffin wax.

In testimony whereof we have hereunto set our hands.

MARTIN MUELLER-CUNRADI.
BERTHOLD OTTENS.